Figure 1:
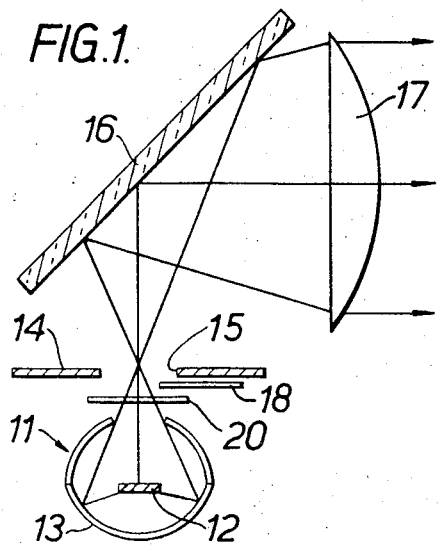

United States Patent [19]
Hicks et al.

[11] 3,818,265
[45] June 18, 1974

[54] LIGHTING SYSTEMS FOR ROAD VEHICLES

[76] Inventors: Harris Vernon Hicks, 61 Ferndale Rd., Lichfield; Kenneth James Jones, 67 Welford Rd., Sutton Coldfield, both of England

[22] Filed: May 10, 1971

[21] Appl. No.: 141,818

Related U.S. Application Data

[60] Division of Ser. No. 798,744, Feb. 12, 1969, Pat. No. 3,673,421, which is a continuation-in-part of Ser. No. 734,300, June 4, 1968, which is a continuation-in-part of Ser. No. 485,788, Sept. 8, 1965, abandoned.

[30] Foreign Application Priority Data

| Sept. 30, 1964 | Great Britain | 39751/64 |
| Sept. 21, 1965 | Great Britain | 39751/65 |
| Sept. 9, 1966 | Great Britain | 40308/66 |
| Sept. 4, 1967 | Great Britain | 40308/67 |
| Jan. 1, 1968 | Great Britain | 00017/68 |
| Jan. 1, 1968 | Great Britain | 00018/68 |
| Jan. 1, 1968 | Great Britain | 00019/68 |
| Feb. 23, 1968 | Great Britain | 8815/68 |
| Feb. 22, 1968 | Great Britain | 8816/68 |

[52] U.S. Cl. .................................... 315/82, 315/83
[51] Int. Cl. ............................................. B60q 1/02
[58] Field of Search ............... 315/82, 83, 83.1; 250/214 C, 234 C

[56] References Cited
UNITED STATES PATENTS

| 2,423,278 | 7/1947 | Willis, Jr. | 315/82 |
| 2,753,487 | 7/1956 | Bone | 315/82 |
| 3,132,252 | 5/1964 | Engelmann | 250/214 |
| 3,249,761 | 5/1966 | Baumanns | 250/234 |

FOREIGN PATENTS OR APPLICATIONS

| 1,098,609 | 1/1968 | Great Britain | 315/82 |

Primary Examiner—Nathan Kaufman
Attorney, Agent, or Firm—Holman & Stern

[57] ABSTRACT

A lighting system for a road vehicle wherein a projector produces a beam of light illuminating the road in front of the vehicle and a receiver senses light from sources in front of the vehicle. Certain wave-lengths are removed from the projected beam and the receiver is principally sensitive to these wave-lengths, so that the risk of the system being operated by its own reflected light is minimised.

4 Claims, 19 Drawing Figures

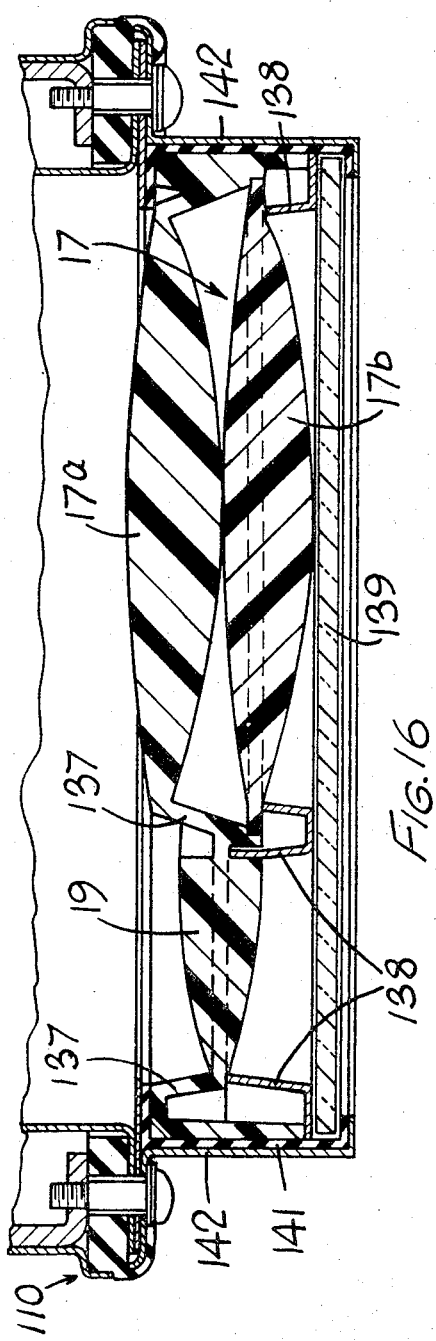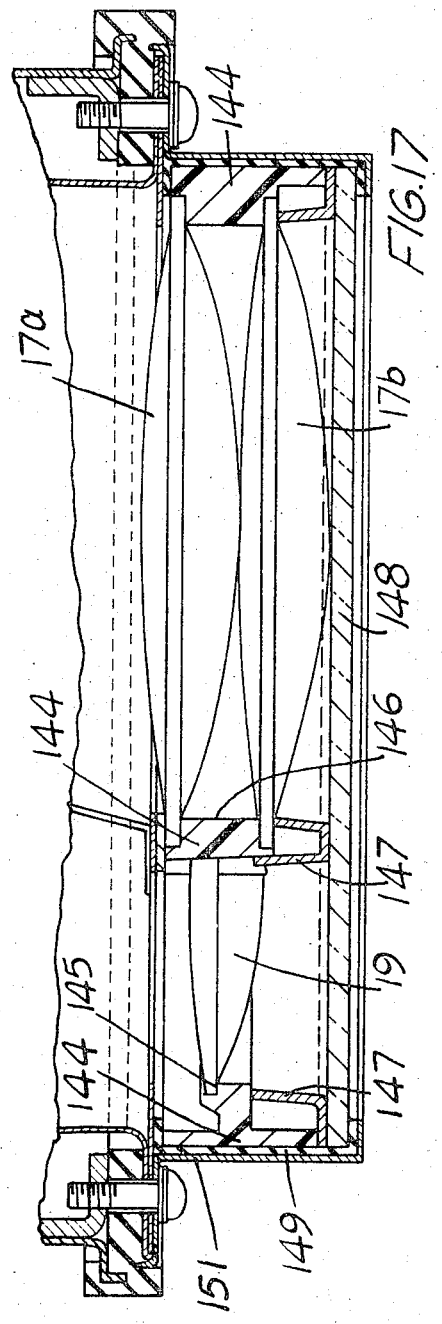

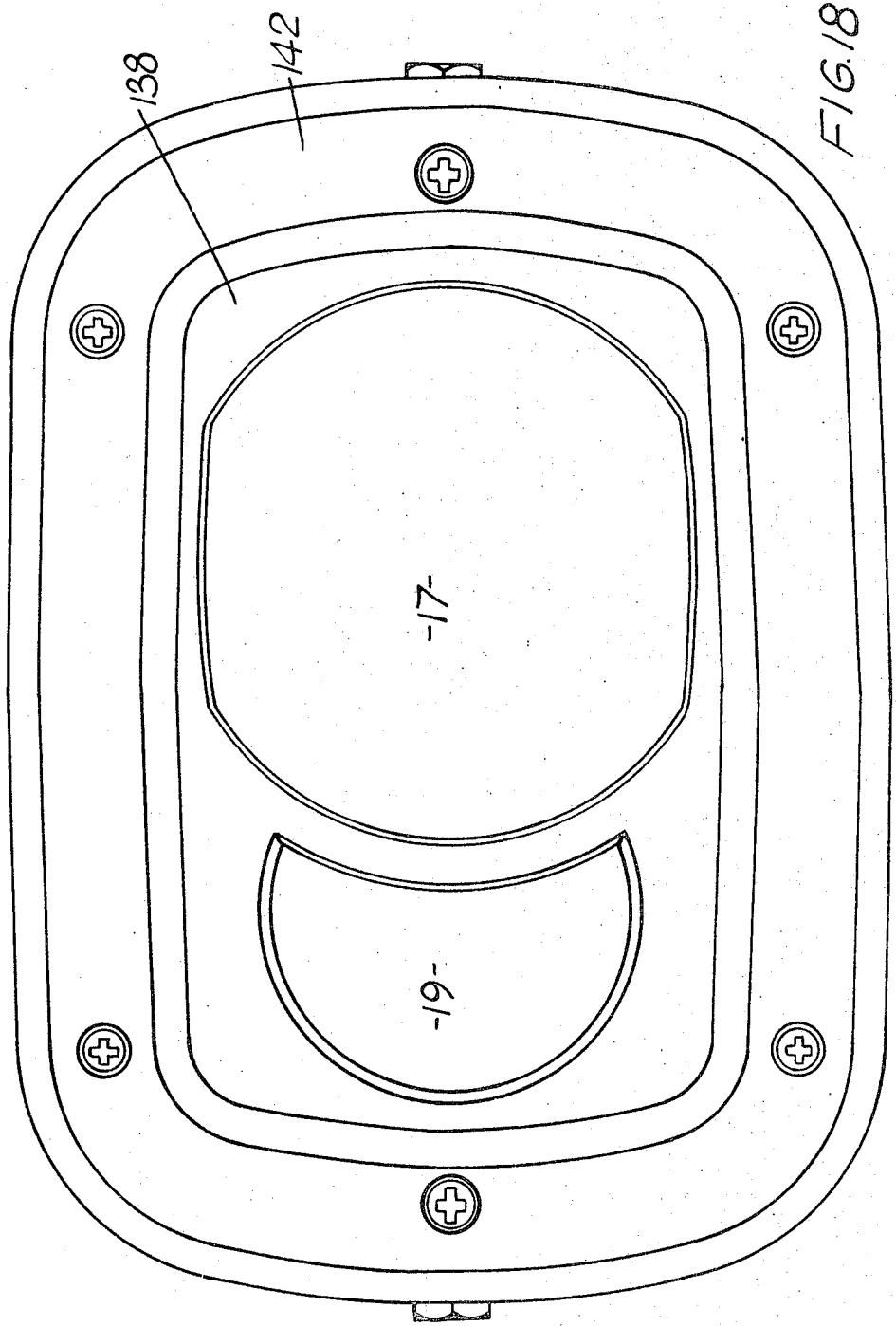

LIGHTING SYSTEMS FOR ROAD VEHICLES

This application is a divisional application from our co-pending application Ser. No. 798,744 filed Feb. 12, 1969 now U.S. Pat. No. 3,673,421, issued June 27, 1972, which application, in turn, is a continuation-in-part of aplication Ser. No. 743,300 filed June 4, 1968 which, in turn, is a continuation-in-part of application Ser. No. 485,788 filed Sept. 8, 1965, now abandoned.

This invention relates to lighting systems for road vehicles and has for an object to provide a system where the risk of operation of the system in response to its own reflected light is minimised.

A lighting system according to the invention includes a light projector for producing a beam of light illuminating the road in front of the vehicle, a light receiver for receiving light from an oncoming vehicle, the receiver being sensitive principally to predetermined wave-lengths, and, means for controlling the projected beam in response to light received from the oncoming vehicle in such a manner that the driver of the oncoming vehicle is not dazzled by the projected beam, the projector including means for removing said predetermined wave-lengths from the projected beam so that said means for controlling the projected beam will not be operated by light emanating from the projector and received by the receiver.

Figure 2:
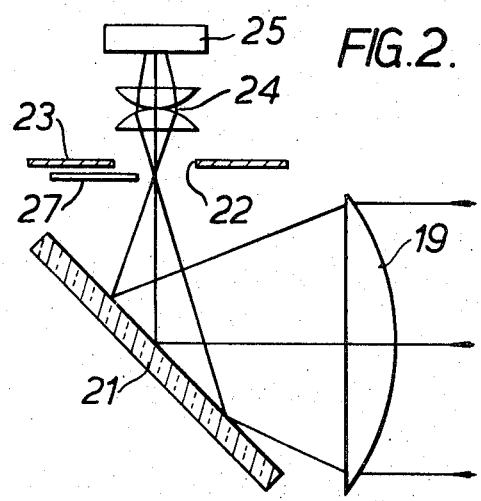
Figure 3:
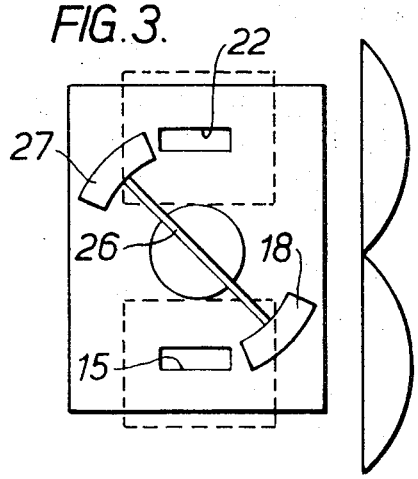
Figure 4:
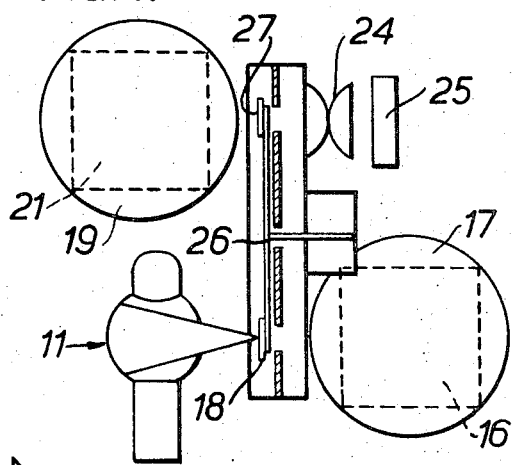
Figure 5:
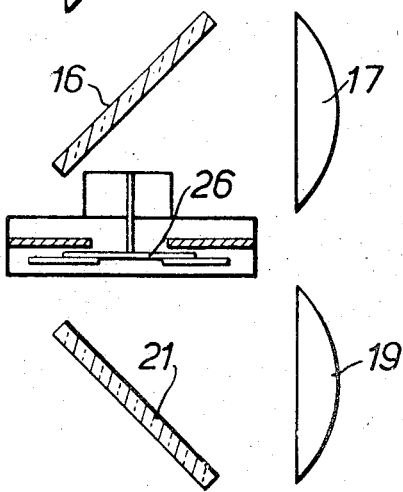
Figure 8:
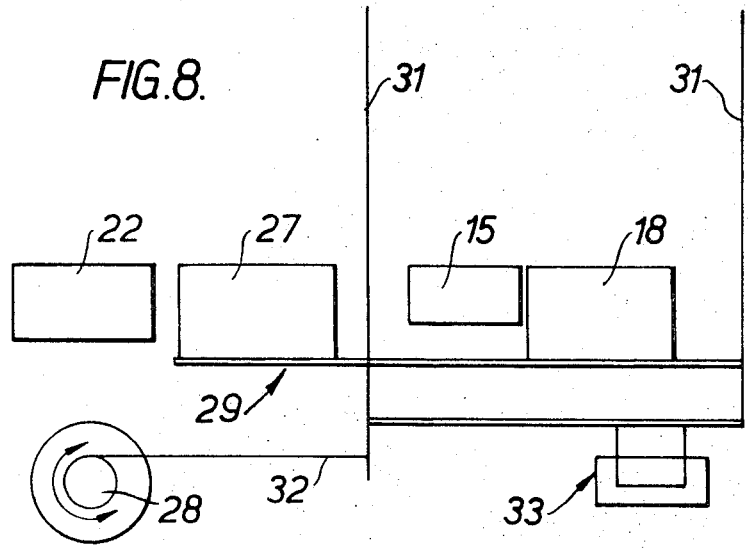
Figure 6:
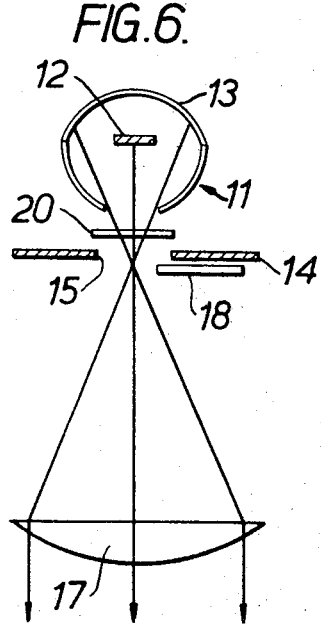
Figure 7:
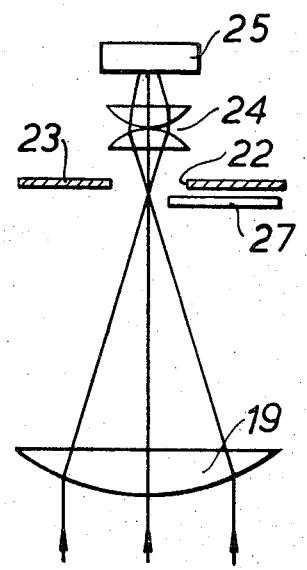
Figure 9:
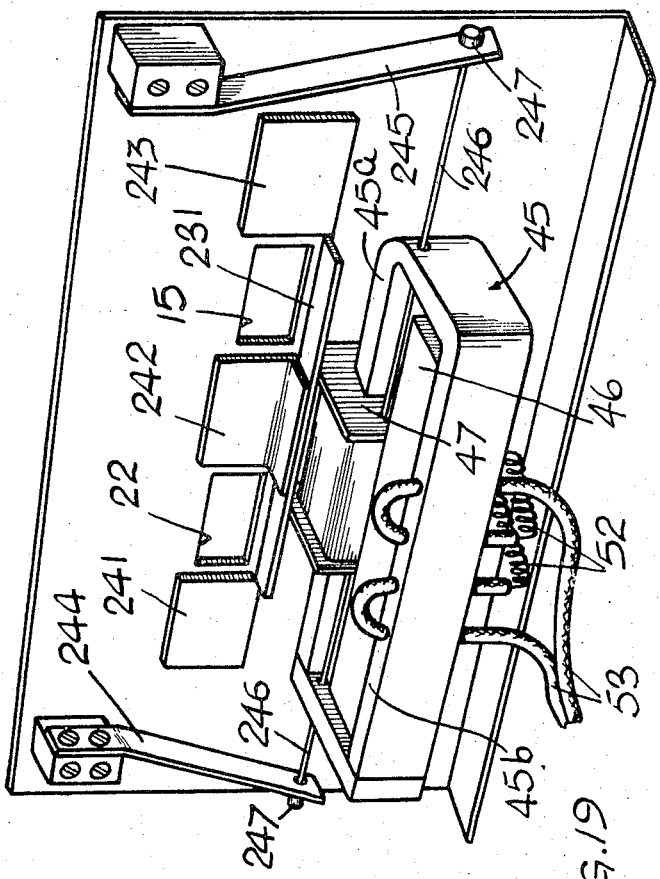
Figure 19:
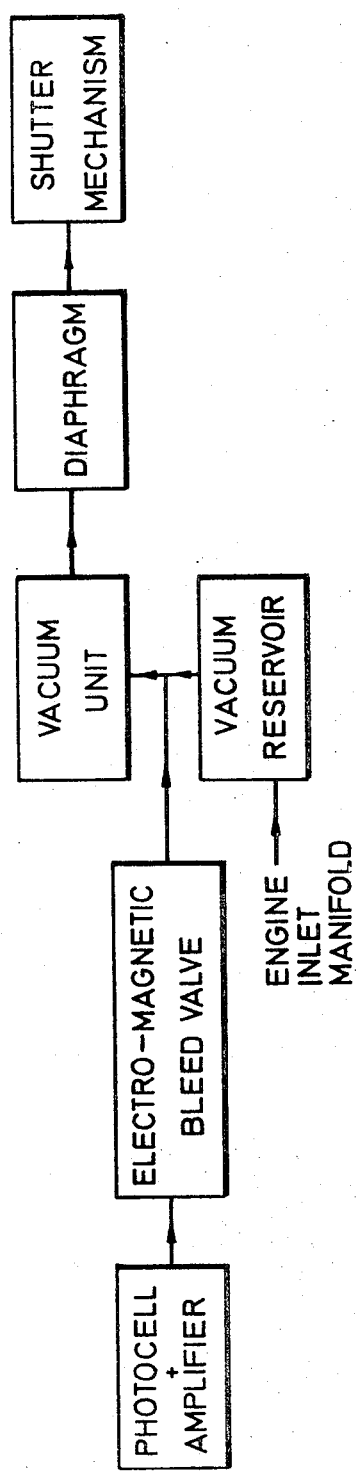
Figure 10:
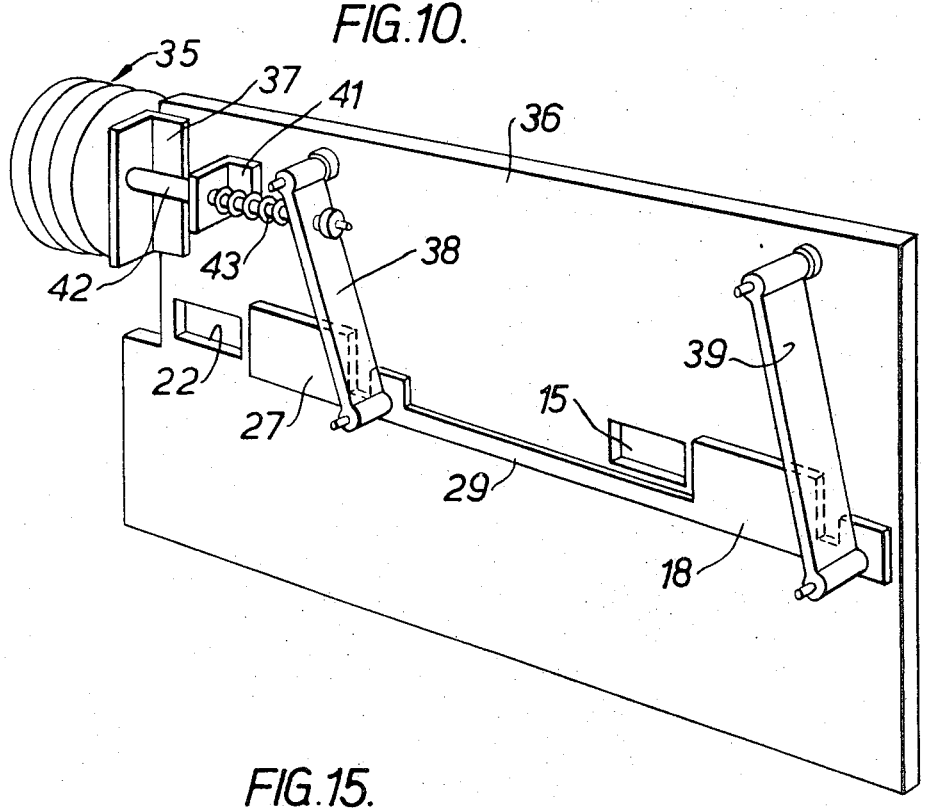
Figure 15:
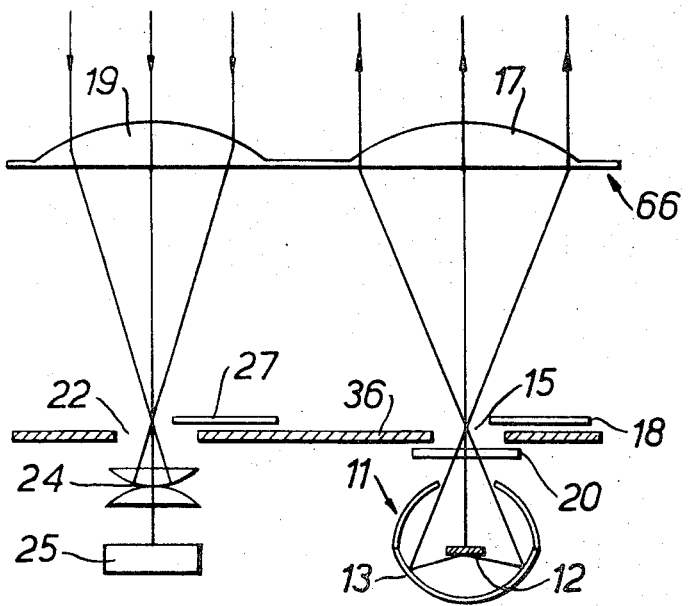
Figure 11:
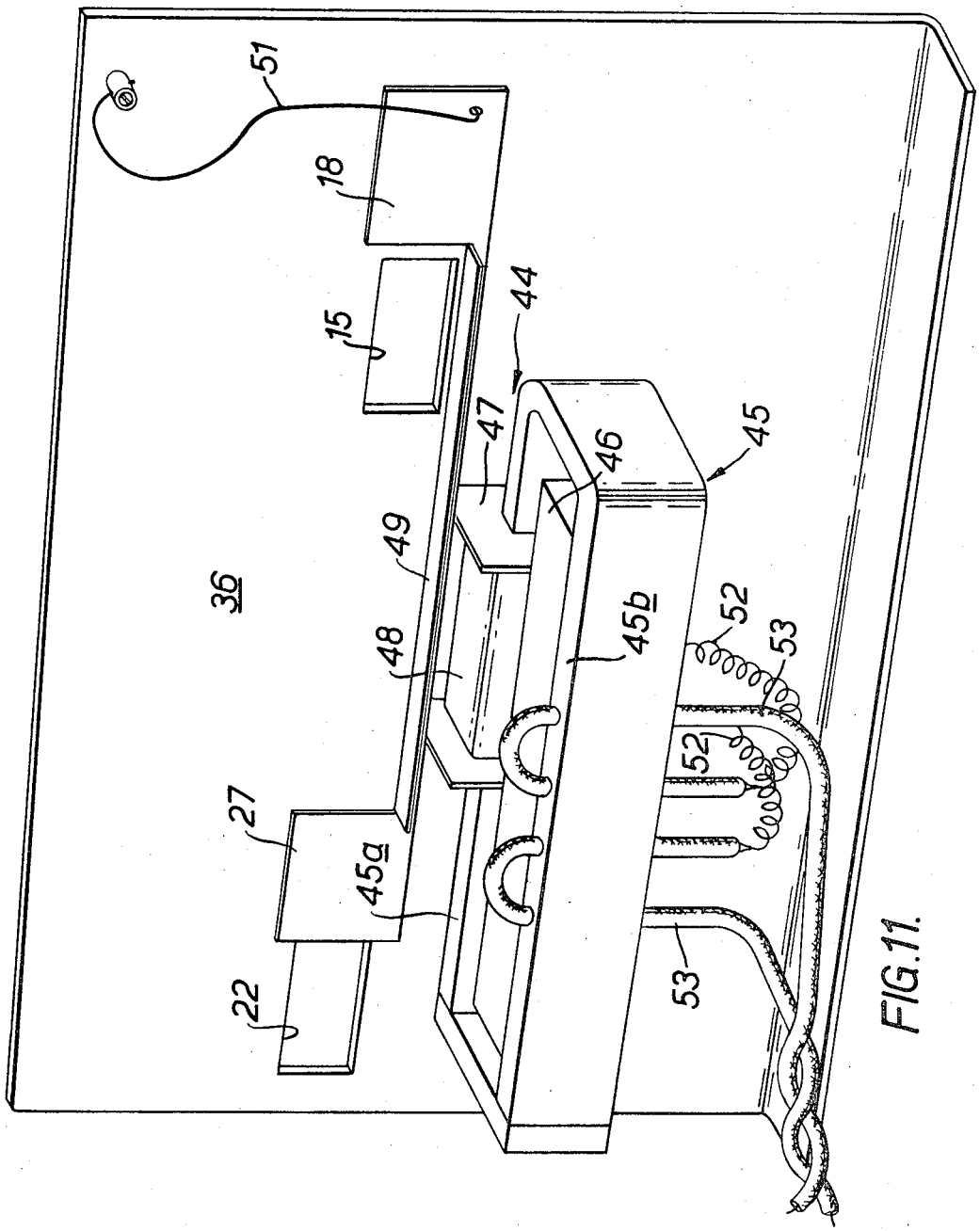
Figure 12:
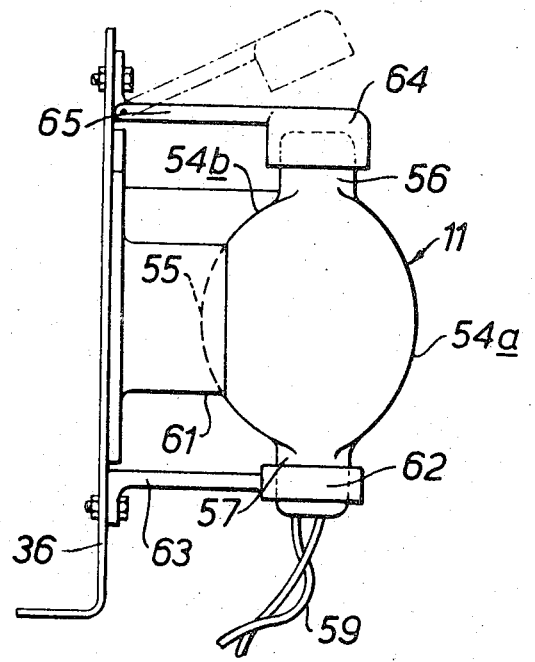
Figure 13:
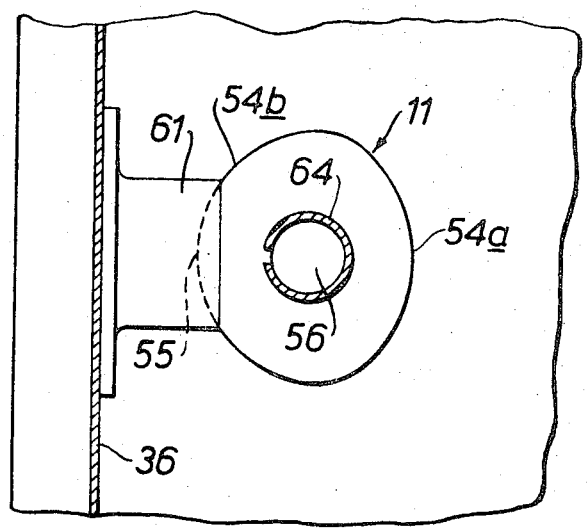
Figure 14:
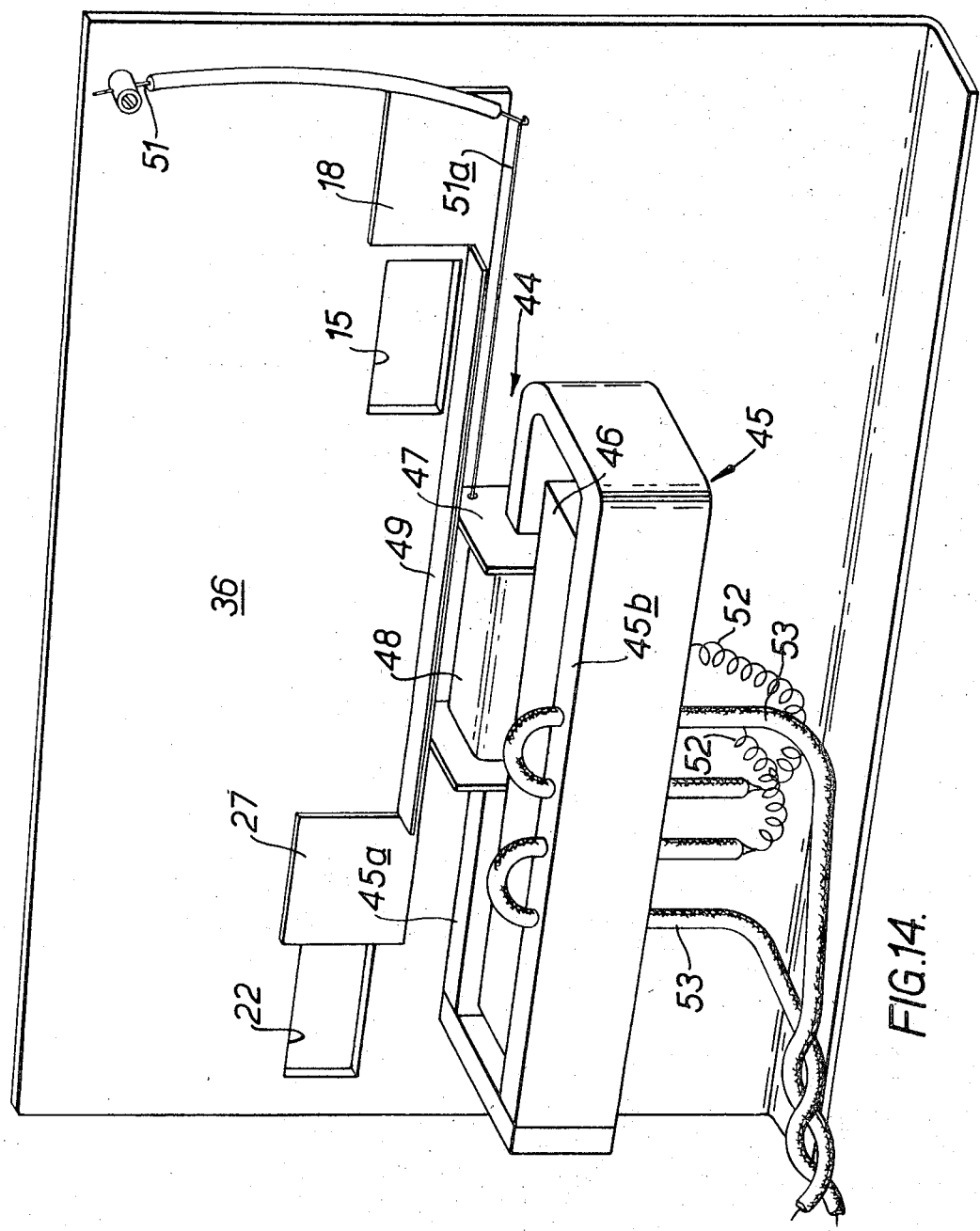

In the accompanying drawings,

FIGS. 1 and 2 are diagrammatic plan views of a projector and a receiver respectively of a lighting system according to one example of the invention, FIGS. 3 to 5 are respectively, side, front and plan views of projector and receiver shown in FIG. 1 together with part of a milliameter with which they are associated, FIGS. 6 and 7 respectively are views similar to FIGS. 1 and 2 of a modified projector and receiver, FIG. 8 is a diagrammatic representation of the modified lighting system utilizing the projector and receiver shown in FIGS. 6 and 7, FIG. 9 is a block diagram illustrating a modification of the system illustrated in FIG. 8, FIG. 10 is a perspective view of the modified system illustrated in FIG. 9, FIG. 11 is a view similar to FIG. 10 of a further modification, FIGS. 12 and 13 are side elevational and part sectional plan views respectively of the projector shown in FIG. 11, FIG. 14 is a view similar to FIG. 11 showing a modified damping arrangement, FIG. 15 is a view similar to FIGS. 6 and 7 showing a modified lens arrangement, FIGS. 16 and 17 are sectional views of alternative forms of lens arrangement, FIG. 18 is a front view of the lens arrangement shown in FIG. 16 and, FIG. 19 is a view similar to FIG. 11 showing a further modification.

Referring first to FIGS. 1 to 5 of the drawings, a road vehicle incorporates a light projector shown in FIG. 1 and a light receiver shown in FIG. 2. The projector includes a bulb 11 having an elongated filament 12 the centre of which is situated at one focus of a part-ellipsoidal mirror 13. Parallel to the filament is a plate 14 having therein a rectangular aperture 15 the centre of which lies at the other focus of the mirror 13, so that an image of the filament appears in the aperture 15.

Light passing through the aperture 15 strikes a plane mirror 16 silvered on its front surface and positioned at 45° to the plate 14, and thence passes through a plano-convex lens 17 which provides a beam of light projecting forwardly of the vehicle. The optical distance between the aperture 15 and lens 17 is equal to the focal length of the lens 17, so that a well defined image of the aperture is projected forwardly, as a beam of rectangular cross section.

Movable across the aperture is a shutter 18 which prevents parts of the light from the filament from reaching the mirror. The arrangement is such that progressive movement of the shutter masks an increasing portion of the beam starting from the side of the beam nearer the centre of the road.

The receiver includes a plano-convex lens 19 which in use directs a parallel beam of light received from an oncoming vehicle onto a mirror 21 silvered on its front surface positioned at 45° to the oncoming beam. The mirror 21 directs the light through an aperture 22 in a second plate 23, the optical distance between the lens 19 and aperture 22 being equal to the focal length of the lens 19. Light passes through the aperture 22 and thence through a converging lens 24 onto a photocell 25. The arrangement is such that an image of the lens in the receiver falls on and almost fully covers the sensitised surface of the cell 25. In this way, the circular image of the receiver lens falls centrally on the photocell irrespective of the position of the image in the aperture 22. If the image falls outside the aperture 22, no light falls on the cell, and so the receiver is to this extent sensitive to the direction of the incoming light.

In use assuming that the projector and receiver are operative, light from an oncoming vehicle falling on the photocell 25 produces a current which is fed into an amplifier which energises an instrument (which is herein referred to as a milliameter) having the construction of a standard milliameter without the usual scale. The pointer of the milliameter, which assumes a position corresponding to the current flowing in the milliameter, is in the form of a diametrically extending arm 26 having the shutter 18 at one end thereof, and a second shutter 27 movagle across the aperture 22 positioned at the other end thereof. The shutter 27 moves across the aperture 22 until the image of lights from an oncoming vehicle is covered, at which point the photocell 25 ceases to produce current and the shutter 27 moves back again. The amplifier is designed to damp fluctuations in the milliameter, which may itself be damped, and so the shutter 27 assumes an equilibrium position with the leading edge of the shutter 27 at a position corresponding to the position of the image in the aperture 22. At the same time the shutter 18 moves across the aperture 15 to reduce the width of the projected beam. The optical axes of the projector and receiver are so arranged that the projected beam is always spaced from the driver of the oncoming vehicle so that he is not dazzled. Moreover, the aperture 22 in the receiver is slightly longer and wider than the aperture 15 in the projector so that irrespective of the angle of approach on the oncoming vehicle the shutters 18, 27 will move sufficiently to avoid dazzle. Thus in the specific case when the image of the lights of an oncoming vehicle is at the extreme end of the aperture 22 the shutter 18 can remain fully closed, because light still falls on the photocell 25 to hold the shutters 18, 27 in position. The system described is intended to be used at the same time as the normal dipped beams of a road vehicle and a filter 20 is used to remove the red and infra-red wave-lengths from the projected beam. The photocell 25 is sensitive only to the removed wavelengths, and so the milliameter will be operated as explained above by an approaching vehicle, but the risk of unwanted operation of the milliameter, for example by light emanating from the projector and reflected from a wall is reduced.

If desired, the lens 17 may be replaced by two thin lenses or by an aspherical lens to enable the intensity of the projected beam to be increased by use of a larger aperture. Moreover the two thin lenses or the aspherical lens can, if desired, be achromatic.

Referring now to FIGS. 6, 7 and 8, in a modification the mirror 16, 21 are dispensed with so that the optical paths of the projector and receiver are straight and parallel and the arm 26 is replaced by a pulley wheel 28. The shutter 18 is carried by a rod 29 which is supported for substantially axial movement by a pair of leaf springs 31. The rod 29 also carries a second shutter 27 associated with the aperture 22 in the receiver. A strap 32 is secured at one end to an extension of one of the springs 31 and extends round the wheel 28, the arrangement being such that as the current is fed to the milliameter in respect to light falling on the photocell 25, the shutters 18, 27 will be moved across their respective apertures 15, 22, in a similar manner to that described above, movements of the rod 29 being damped by an eddy current brake 33.

In the further modification shown in FIGS. 9 and 10 the shutters 18, 27 are operated by a vacuum unit in place of the milliameter. The vacuum unit includes a diaphragm one side of which is subjected to atmospheric pressure while the other side is subjected to a reduced pressure controlled by an electro-magnetic bleed valve, which in turn is controlled by the photocell 25. Movement of the diaphragm in response to changes in the reduced pressure are transmitted to the shutters 18, 27 to open and close the apertures 15, 22. A convenient source of reduced pressure is the engine inlet manifold.

It will be appreciated that since a vacuum unit is more powerful than the milliameter movement it is not necessary to use the delicate leaf spring arrangement to support the rod 29 when a vacuum unit is used.

FIG. 10 illustrates a more robust arrangement utilizing a vacuum unit. The vacuum unit 35 is carried by a bracket 37 at one end of a back plate 36 which has formed therein the apertures 15, 22, the plate 36 constituting the masks 14, 23. Pivotally mounted on the plate 36 for movement in a plane parallel to the plate 36 are a pair of parallel arms 38, 39 and pivotally mounted at the lower ends of the arms 38, 39 is the rod 29 carrying the shutters 18, 27. Extending from the vacuum unit 35, through the bracket 37 and a further bracket 41 is a link member 42 which is engaged at its end remote from the unit 35 with the arm 38 at a point on the arm 38 adjacent the pivotal connection of the arm 38 with the plate 36. Interposed between the arm 38 and the bracket 41 and surrounding the member 42 is a compression spring 43 which urges the arm 38, and consequently the arm 39 and the rod 29, to a position where the apertures 15, 22 are open. The vacuum unit 35 is controlled in the manner previously described to operate the shutters 18, 27.

In a still further modification shown in FIG. 11 the milliameter is replaced by an instrument 44. The instrument 44 comprises a rectangular soft iron frame 45, the limbs of which are of rectangular cross section. The frame 45 is secured to a plate 36, which constitutes the masks 14, 23, so as to extend in a plane at right angles thereto, the long limb 45a of the frame 45 adjacent the plate 36 being spaced from the plate 36 and being arranged parallel to and below the apertures 15, 22. A ferrite magnet 46 is secured to the other long limb 45b of the frame and is housed between the limbs 45a, 45b of the frame, the width of the magnet 46 being substantially equal to the length of the limb 45b of the frame. The north pole of the magnet 46 is in contact with the limb 45b, and since the frame 45 is a closed circuit the whole of the frame 45 is of north polarity with respect to the south pole of the magnet 46, the south pole of the magnet 46 being spaced from the limb 45a of the frame 45 by an air gap. Thus part of the magnetic field of the frame 45 and the magnet 46 extends between the limb 45a of the frame 45 and the south pole of the magnet 46 at right angles to the limb 45a.

Slidably mounted on the limb 45a of the frame 45 is a spool 47 having a rectangular annular cross section, on which is wound a winding 48 the winding 48 surrounding the limb 45a of the frame 45. The spool 47 carries an aluminum strip 49, the ends of which define respectively the shutters 18, 27. The shutters 18, 27 are so positioned that as the spool 47 moves along the limb 45a of the frame 45, the shutters 18, 27 will be moved across the apertures 15, 22, respectively. The spool 47 is urged to a position wherein the apertures 18, 22 are uncovered by a wire spring 51, one end of the spring 51 being adjustably secured to the plate 36 while the other end of the spring 51 engages the shutter 18.

In order that electrical connections can be made to the winding 48 without hindering the movement of the spool 47, there are provided a pair of fine copper wire pigtails 52, which are electrically connected at one end to the ends of the winding 48 respectively.

The other ends of the pigtails 52 are connected respectively to the ends of a pair of leads 53 which in turn are connected to the amplifier which receives current from the photocell 25.

In order to minimise the risk of breakage of the pigtails 52 owing to movement of the leads 53 in use, the limb 45b of the frame 45 is formed with two parallel pairs of parallel bores, each leads 53 being threaded through a respective pair of bores to the connection thereto of the pigtails 52. Thus as light falls on the photocell electric current flows in the winding 48, and the spool 47 and the shutters 18, 27 are moved against the action of the spring 51, so that the shutters 18, 27 move across the apertures 15, 22. The outer shutter 27 is moved across the apertures 22 until the image of the lights of the oncoming vehicle is covered, at which point the photocell causes to produce current and the spool 47 moves back again under the action of the spring 51, whereupon the photocell again produces a current. Thus the spool 47 and consequently the shutters 18, 27 tend to reciprocate through a very short stroke about the point at which the image of the lights of the oncoming vehicle are covered.

In order to stabilize the spool 47 to reduce the reciprocation, the strip 49 has slidably mounted thereon, a block of polytetrafluoroethylene (not shown) which is engaged between a pair of lugs upstanding from the plate 36. The lugs are spaced apart by a distance fractionally larger than the length of the p.t.f.e. block. Thus when the spool 47 is moved from its rest position the block is moved into engagement with one of said lugs whereupon movement of the block is arrested. The spool 47 continues to move and the strip 49 slides relative to the block, it being appreciated that the coefficient of dynamic friction of p.t.f.e. is very low. However, when the spool 47 reaches the position wherein the shutter 27 covers the image of the lights from the oncoming vehicle the reciprocation of the spool are damped by the added inertia of the p.t.f.e. block since the block would be carried back and forth between said lugs. Moreover should the inertia of the block be insufficient to damp the reciprocation of the spool then each time the block contacts one of the lugs, movement of the strip 49 relative to the block will be resisted by the static friction of the block and the strip 49 it being appreciated that the coefficient of static friction of any material is greater than the coefficient of dynamic friction of that material.

The p.t.f.e. block can be engaged with the strip 49 between the shutters 18, 27 or can be engaged with an integral extension at one end of the strip 49 and moreover said lugs can be defined by the walls of an aperture in the plate 36 in which the block is positioned.

Thus when light from an oncoming vehicle enters the receiver the spool 47 assumes an equilibrium position with the leading edge of the shutter 27 at a position corresponding to the position of the image in the aperture 22. At the same time the shutter 18 has been moved across the aperture 15 and so reduces the width of the projected beam. The optical axes of the projector and receiver are parallel and are so arranged that the projected beam is always spaced from the driver of the oncoming vehicle so that he is not dazzled. The leading edge of shutter 18 is in advance of the leading edge of the shutter 27 thereby ensuring that the oncoming driver's eyes are always in shadow, and moreover the aperture 22 is slightly wider and longer than the aperture 15. Thus, in the specific case when the image of the lights of an oncoming vehicle is at the extreme end of the aperture 22 the shutter 18 can remain fully closed because light still falls on the photocell 25 to hold the shutters 18, 27 in position. The system described is intended to be used at the same time as the normal dipped headlamp beams of a road vehicle, and again a filter 20 is used to remove the red and infra-red wavelengths from the projected beam, the photocell 25 being sensitive principally to the read and infra-red wave-lengths.

Referring now to FIGS. 12 and 13 the bulb 11 of the projector includes a sealed, two part envelope having a part ellipsoidal rear portion 54a and integral therewith, a hemispherical front portion 54b the centre of curvature of portion 54b and one focal point of the portion 54a being a common point. The inner surface of the envelope is coated so as to constitute the mirror 13, a circular area at the centre of the hemispherical portion 54b being left clear to constitute a window 55. The filament 12 of the bulb is positioned within the envelope so as to extend transversely through a point constituting the centre of the portion 54b and said one focal point of the portion 54a and the envelope further includes upper and lower axially aligned cylindrical portions 56, 57 the axis of which passes through said point, at right angles to the axis of the filament 12. A pair of connecting leads 59 extend through the wall of the portion 57 of the envelope and are connected respectively to the ends of the filament 12. The reflective portion of the envelope of the bulb 11 is such that a magnified image of the filament 12 is produced at the other focal point of the portion 54a of the envelope. As previously stated the image of the filament 12 is projected into the aperture 15 and in order to position the bulb 11 so that the other focal point of the portion 54a of the envelope lies in the plane of the aperture 15, the portion 54b of the envelope is engaged with the free end of a hollow cylindrical member 61 which is secured to the plate 36. The member 61 surrounds the aperture 15 and extends at right angles to the plate 36, the axis of the member 61 passing through the mid-point of the aperture 15. Moreover, the length of the member 61 is such that when the bulb 11 is engaged therewith then the image of the filament 12 projected by the bulb 11 will fill the aperture 15.

The engagement of the portion 54b of the envelope with the end of the member 61 constitutes a ball and socket joint between the bulb 11 and the member 61, the bulb 11 being pivotable with respect to the member 61 about the common point defining said one focus of the portion 54a and the centre of curvature of the portion 54b. In order to maintain the bulb 11 in engagement with the member 61, there is provided a collar 62 which is supported in a rigid bracket 63 secured to the plate 36 of the projector, the portion 57 of the envelope of the bulb 11 being received as a push fit in the collar 62. In addition to the collar 62 there is provided a second collar 64 which is carried at one end of a bracket 65 which is also secured to the plate 36. The bracket 65 is hinged and is movable to a position wherein the portion 56 of the envelope of the bulb is received as a push fit in the collar 64.

The collars 62, 64 and their respective brackets 63, 65 are so dimensioned that when the collars 62, 64 are engaged with the portions 56, 57 of the envelope of the bulb 11 and the portion 54b of the envelope of the bulb 11 is engaged with the member 41 then the magnified image of the filament 12 of the bulb will be projected into the aperture 15.

In order to replace a bulb 11 which has failed the collar 64 is disengaged from the portion 56 by hinging the bracket 65 to the position shown in dotted lines in FIG. 12. The faulty bulb is then removed and replaced by a new bulb, the connections to the new bulb are made by the leads 59 and the collar 64 is then engaged with the new bulb.

In a modification of the system described with reference to FIGS. 11 to 13, the polytetrafluoroethylene damping block is dispensed with, and the end of the wire spring 51 is connected to the spool 47 by means of a flexible thread 51a.

In order to stabilise the spool 47 to reduce the reciprocation thereof the wire spring 51 is enclosed in a moulded synthetic resin sheath 51b (FIG. 14). The sheath 51b is moulded, in for example, p.v.c. and has a flaccid nature, that is to say that the sheath has no inherent resilience. The sheath 51b serves to damp vibrations of the wire spring 51, and so consequently damps the reciprocation of the spool 47 and the shutters 18, 27. In a modification of the system a second wire spring, with associated sheath, acts between the plate 36 and an extension of the shutter 27, so that the two springs act in unison on the shutter assembly.

Each sheath can be moulded around its respective wire spring, or can be threaded on to its respective wire spring and held in place by any conventional means.

The filter 20 which, as described above, is included in the projector to remove the red and infra-red wavelengths from the projected beam is dispensed with in a modification. In the modification the mirror 13 is a dichroic mirror the coating of which is such that it reflects all wave-lengths in the light from the filament 12 other than red and infra-red, but transmits the red and infra-red wave-lengths. Thus the red and infra-red wave-lengths are not present in the projected beam and since the photocell 25 is principally sensitive to these wave-lengths the risk of operation of the system by its own reflected light is minimised.

Referring to FIG. 15, it will be appreciated that since the projector and receiver must be accurately correlated with one another to ensure that the driver of an oncoming vehicle is not dazzled, then it is important that the lenses 17, 19 are positioned accurately with respect to one another on the casing of the system. Thus in a modification of the lens arrangement in order to minimise the risk of misalignment of the lenses 17, 19 with respect to one another, the lenses 17, 18 are moulded as integral parts of a rectangular plate 66. Thus the lenses 17, 19 are always maintained in said accurately predetermined relation to one another, and since the lenses are integral with one another, the tolerances involved in the mounting of the lenses are kept to a minimum.

FIGS. 16, and 18 show a practical form of lens assembly wherein the receiver lens 19 is crescent shaped and the projector lens 17 is a compound lens. To ensure accuracy in mounting the lenses 17, 19 relative to one another one element 17a of the lens 17 is moulded integrally with the lens 19, the element 17a and the lens 19 being part of a plate 137. The second element 17b of the lens 17 is moulded separately but is accurately positioned relative to the element 17a by locating means on the plate 137, the element 17b being secured to the plate by an adhesive. There is further provided a masking plate 138 which masks the areas of the plate 137 other than the lens 19 and the element 17a. The front surfaces of the plate 137, the element 17b, and the plate 138 are protected by a transparent cover 139 and the assembly so formed is secured together by an annular rubber frame 141 which seals the periphery of the assembly. The assembly is secured in position on the casing 110 of the system by a clamping ring 142 secured to the casing 110 by screws.

The lens assembly shown in FIG. 17 differs from that shown in FIG. 16 in that the lens 19 and the lens element 17a are not integral parts of a plate. In the alternative lens assembly shown in FIG. 17 there is provided a moulded rectangular lens support member 144 having therein a crescent shaped aperture 145 and a generally circular aperture 146. The walls of the aperture 145 are shaped to receive and locate the crescent shaped receiver lens 19 which can be secured to the member 44 using an adhesive. The projector lens 17 is again in two elements 17a, 17b and the walls of the aperture 146 are shaped to receive and locate the elements 17a, 17b which can also be secured to the member 144 using an adhesive. A masking plate 147 having therein a crescent shaped aperture and a generally circular aperture is engaged with the front face of the assembly and masks the assembly other than the lenses 17, 19. The masking plate 147 and a transparent cover 148 are secured in position by an annular rubber frame 149 which seals the periphery of the assembly and the assembly is secured in position on the casing 110 of the system by a clamping ring 151 secured to the casing 110 by screws. Since the lenses 17, 19 are located by a common member then the tolerances involved in the mounting of the lenses are reduced as compared with providing the lenses with separate mounting members.

The radius of the crescent shaped portion of the receiver lens 19 is substantially equal to the radius of the projector lens 17 and the lens 19 is so positioned with respect to the projctor lens 17 that the concave edge of the lens 19 is parallel with the convex edge of the lens 17, thereby reducing the overall width of the lens assembly as compared with an assembly wherein both of the lenses are generally circular.

The projector lenses 17 in the examples described above are not achromatic and so a certain amount of dispersion of the projected beam occurs. The blue component of the projected beam will occur on the fringes of the beam after dispersion and since the blue lights are used by certain traffic authorities to denote traffic hazards then it is desirable that oncoming motorists do not see blue light emanating from the projector of the system. The emission of blue light from the system can be minimised by making the lens 17 achromatic. Alternatively, the blue light can be removed by choosing the dichroic coating of the mirror 13 so that the mirror 13 reflects neither the blue wave-lenghts nor the red and infra-red wave-lengths. Furthermore the blue light can be removed by coating the lens 17 or a corresponding area of the transparent cover of the lens assembly with a material which is opaque to blue light so that the blue light in the projected beam is not transmitted.

The modified system shown in FIG. 19 is suitable for use both in countries having left-hand rule of the road and countries having right-hand rule of the road. The modified system is similar to the system described with reference to FIG. 11 and parts common to both systems carry the same reference numerals. In the system shown in FIG. 19 the spool 47 carries an aluminum strip 231 on which are integrally or separately mounted three shutters 241, 242, 243, the spool 47 is urged to the central position shown in which the shutters are spaced from both apertures 15,22 by one of a pair of leaf springs 244, 245 mounted on the plate 36. The spool is coupled to the leaf springs by a self-supporting filament 246 the central portion of which is connected to the spool and the ends of which extend through holes in the ends of the leaf springs 244, 245 the ends of the filament 246 having connected thereto studs 247. Electrical connections are made to the winding 48 through fine copper wire pigtails 52, which are electrically connected at one end to the ends of the winding 48 and are further connected to the ends of a pair of leads 53 coupled to the amplifier.

The vehicle is provided with a selector switch which determines whether the lighting system is suitable for use in a country having a left-hand rule of the road or a right-hand rule of the road. The selector switch is simply a reversing switch controlling the direction of current flow to the receiver, and for the moment it will be assumed that the switch is set for a country with a left-hand rule of the road.

Normally, the shutters are in the position shown and a beam of light is projected through the aperture 15 as previously explained. When light from an oncoming vehicle enters the aperture 22 it falls on the photocell 25 so that current is fed to the winding 48, this current causing the spool 47 to move to the left, so that the shutters 243 and 242 move across the apertures 15 and 22 respectively. The filament 246 slides through the leaf spring 244, which therefore is not stressed, and when the stud 247 reaches the side of the casing supporting the plate 36 the filament bends with the stud 247 sliding down or up the wall of the casing. The leaf spring 245 is, of course, stressed by the movement of the spool 47.

Assuming for the moment that the two approaching vehicles are stationary, then the system assumes an equilibrium position with the leading edge of the shutter 242 at a position corresponding to the position of the image in the aperture 22. At the same time, the shutter 243 assumes a position in the aperture 15 in which the width of the projected beam is such that the driver of the oncoming vehicle is not dazzled. The leading edge of the shutter 243 is arranged to be just in advance of the leading edge of the shutter 242, so ensuring that the oncoming driver's eyes are always in shadow, and furthermore the aperture 22 is slightly wider and longer than the aperture 15 so that if the image of the lights of an oncoming vehicle is at the extreme end of the aperture 22, the shutter 243 can remain fully closed, because light still falls on the photocell 25 to hold the shutters 242, 243 in position. It will of course be appreciated that the system described is intended to be used at the same time as the normal dipped headlamp beams of a road vehicle. In practice of course the vehicles will be approaching each other continously so that the position of the image in the aperture 22 changes continuously, but the system automatically adjusts the position of the shutters so that the oncoming driver is not dazzled at any time. The spring 245 urges the shutters back to the position shown at all times, so that when no further input is received from the amplifier the parts assume the position shown.

It will be apparent that when a left-hand rule of the road is being observed, the shutter 241 plays no part at all in the operation. When the selector switch is set for right-hand rule of the road, the operation is similar to that described above, except that the shutter 242 is now used to control the projected beam, with the shutter 241 controlling the received beam and the shutter 243 playing no part in the operation. In these circumstances of course the spring 245 is unstressed but the spring 244 is stressed.

It will be appreciated that by having a self-supporting filament 246 which, depending on the direction of movement of the spool, slides relative to one of the leaf springs 244, 245, the overall width of the plate 36 can be reduced, because if the filament 246 were connected to both leaf springs, then when for example, the spring 244 was in use, the spring 245 would also flex and move to the right, so that it would be necessary to allow for this movement in the width of the plate 36. The filament 246 is small in diameter, and although it passes through a hole in the spool 47 and is secured thereto, it does not substantially affect the magnetic properties of the spool.

In a modification of the system, the ends of the filament 246 are bent upwardly and secured to the springs 244, 245 so that the filament cannot slide relative to the springs. The dimensions are such that the distance from the frame 45 to the springs in the rest position is less than the distance from the frame 45 to the spool so that when the spool moves to the right, for example the part of the filament between the frame 45 and the spring 245 loops downwardly. The operation is similar when the carriage moves to the left.

In any of the examples described above the light source of the projector can be a bulb, the envelope of which constitutes a reflector, as described above or can be a bulb with a clear envelope having a separate reflector associated therewith. Moreover, the leads 53 and pigtails 52 can be replaced by flexible leads electrically connected to the winding and secured to the limb 45b of the frame 45 by means of a clamping plate which is held in position by screws. We claim:

1. A lighting system for a road vehicle, said system including a light projector means for producing a beam of light having a given frequency spectrum, said light projector means incorporating means to remove predetermined frequencies from said beam of light within said given spectrum, said light projector means being directed so that the light beam illuminates the road in front of the vehicle, a light receiver means for receiving light from an on-coming vehicle, the receiver means being sensitive principally to received light of said predetermined frequencies so that the receiver means is insensitive to light emanating from the projector means and reflected back to said receiver means, and means coupled between said light receiving means and said light projector means for controlling the field of illumination of the projected beam in response to light received from the on-coming vehicle so that the projected beam does not illuminate in the direction of the on-coming vehicle and the driver of the on-coming vehicle is thereby not dazzled by the projected beam.

2. A system as claimed in claim 1 wherein said means for removing said predetermined frequencies includes a filter through which light constituting said beam must pass, the filter preventing passage of the predetermined wave-lengths.

3. A system as claimed in claim 1 wherein said means for removing said predetermined frequencies includes a dichroic mirror from which light constituting said beam is reflected in use, the dichroic mirror transmitting said predetermined wave-lengths so that they are not present in said beam.

4. A system as claimed in claim 1 wherein the predetermined frequencies are red and infra-red.

* * * * *